H. GREEN.
REIN HOLDER.
APPLICATION FILED SEPT. 29, 1908.
943,537.  Patented Dec. 14, 1909.
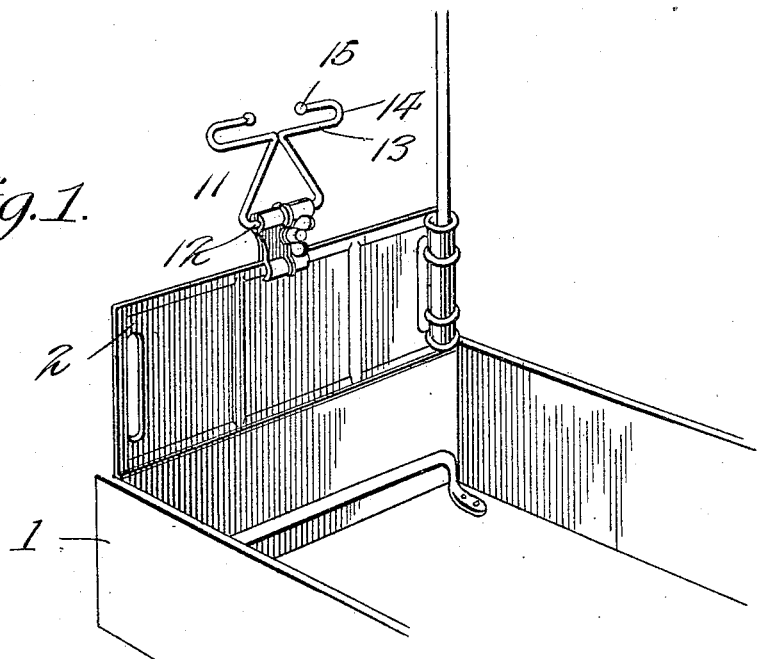
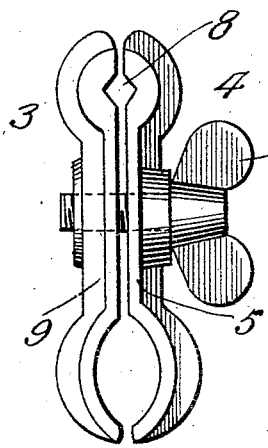
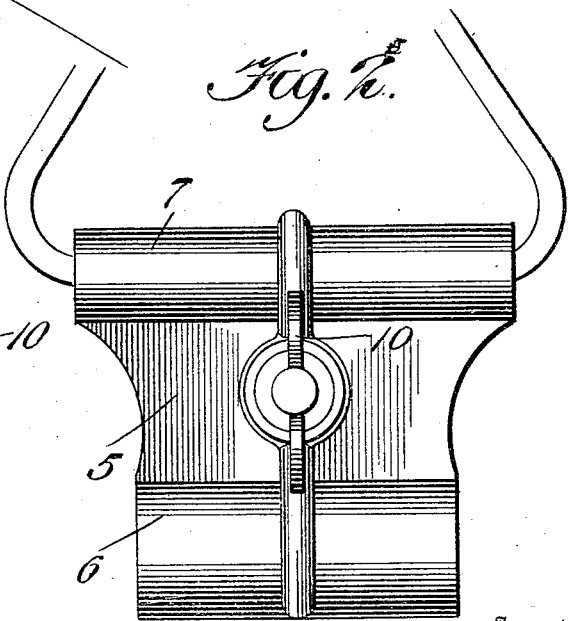
Inventor
Henry Green.
By Victor J. Evans
Attorney

UNITED STATES PATENT OFFICE.

HENRY GREEN, OF GRIGGSVILLE, ILLINOIS, ASSIGNOR TO RHODA E. DIMMITT, OF GRIGGSVILLE, ILLINOIS.

REIN-HOLDER.

943,537.	Specification of Letters Patent.	Patented Dec. 14, 1909.

Application filed September 29, 1908. Serial No. 455,252.

*To all whom it may concern:*

Be it known that I, HENRY GREEN, a citizen of the United States, residing at Griggsville, in the county of Pike and State of Illinois, have invented new and useful Improvements in Rein-Holders, of which the following is a specification.

This invention relates to rein supports, and is especially designed for application upon the dash boards of vehicles, and the object of the invention is to provide a device of this character which may be readily and quickly applied in position upon the dash board or other parts of a vehicle and which may be easily and quickly detached therefrom when desired.

With these and other objects in view, which will appear as the description of the device progresses, the invention resides in the novel construction and arrangement of parts hereinafter fully described and claimed.

In the drawings which accompany this specification and in which similar numerals of reference refer to corresponding parts, throughout the several views, Figure 1 is a perspective view of my improvement illustrating the same in applied position upon the dash board of a vehicle. Fig. 2 is a front elevation of the same, detached from the vehicle. Fig. 3 is a side elevation of the clamping device employed with the improvement.

In the accompanying drawings the numeral 1 designates the body of an ordinary vehicle provided with a customary dash board 2. The dash board 2 is of the ordinary construction being provided with a metallic frame having the ordinary leather or oil cloth cover, the iron frame forming an enlarged or projecting portion of the dash board in the well known manner.

In applying my improvement to the dash board or to other portions of a vehicle I provide a pair of clamping members 3 and 4. These clamping members are of a similar construction each providing a central body portion 5 from which depends a substantially arcuate lower engaging member 6. The upper portion of the members 3 and 4 are each provided with an elongated longitudinally extending portion 7, having its inner face substantially V-shaped as designated by the numeral 8 and clearly illustrated in Fig. 3 of the drawings. The members 3 and 4 are each centrally provided with a reinforcing rib 9, and are also provided with suitable openings adapted for the reception of a winged bolt 10 by which the members may be secured upon the dash board or other parts of a vehicle. If necessary one of the members providing the clamp may be formed with an integrally projecting screw adapted for engagement with the winged nut 10, or one of the members may have a screw threaded element projecting through its central opening and through the opening of the opposite member which is also adapted to be engaged by a threaded element similar to the winged nut 10.

The rein holder proper is preferably constructed of a single strand of wire or other suitable material, and this holder 11 comprises a lower or base portion 12, adapted to be engaged between the V-shaped mouths of the clamping members 3 and 4. The base portion 12 of the rein holder has its ends opposite the sides of the clamping members 3 and 4 bent upwardly at an angle toward each other so as to contact with each other a suitable distance above and approximately central of the clamping elements. These members are then bent horizontally in opposite directions so as to provide a horizontal portion 13, and after extending a suitable distance away from each other are bent upon themselves in a substantially U-shape as indicated by the numeral 14 and are then brought over the horizontal members 13 a suitable distance and are provided with heads 15 which are positioned a distance from each other and from the central portion of the horizontal members 13 to allow for the reception of the reins and yet provide means for effectively supporting the reins upon the horizontal members 13.

From the above description, taken in connection with the accompanying drawings, it will be noted that I have provided an extremely simple and efficient device for supporting reins upon a vehicle body, one wherein the rein holder proper may be arranged at any desired angle and effectively retained in the desired position, also a device which may be readily applied to or detached from the dash board or any other desired portion of the vehicle. It will be also understood that the device is extremely simple in construction, easily applied, and which may be manufactured at a comparatively low cost.

Having thus fully described the invention what is claimed as new is:

In a rein holder for the dash board of a vehicle a pair of plates, each of said plates being provided with a central opening, one of the plates being threaded, a securing element for this threaded opening, the plates having their lower portions concaved and their upper portions provided with a V-shaped longitudinally extending depression, a rein retaining element positioned within the V-shaped depressions of the plates, said element being constructed of a single strand of wire having its sides bent upwardly from its engagement with the clamp so that the said side members contact each other central of the clamp, the sides of the said element being also bent in opposite directions to provide horizontal portions and having their ends bent and projected toward each other directly above the horizontal portions and the said ends being provided with enlargements, substantially as described.

In testimony whereof I affix my signature in presence of two witnesses.

HENRY GREEN.

Witnesses:
  JNO. W. STEAD,
  MAURICE SCOTT.